United States Patent
Peake et al.

(10) Patent No.: US 8,655,559 B2
(45) Date of Patent: Feb. 18, 2014

(54) AGRICULTURAL AUTOPILOT PATH ADJUSTMENT

(71) Applicants: John W Peake, Mountain View, CA (US); Gurcan Aral, Cupertino, CA (US); Gregory D Chiocco, Sunnyvale, CA (US)

(72) Inventors: John W Peake, Mountain View, CA (US); Gurcan Aral, Cupertino, CA (US); Gregory D Chiocco, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 13/927,877

(22) Filed: Jun. 26, 2013

(65) Prior Publication Data

US 2013/0289833 A1    Oct. 31, 2013

Related U.S. Application Data

(62) Division of application No. 13/108,826, filed on May 16, 2011, now Pat. No. 8,494,726.

(51) Int. Cl.
*G01C 21/00* (2006.01)

(52) U.S. Cl.
USPC .................................. 701/50; 701/23; 701/26

(58) Field of Classification Search
None
See application file for complete search history.

(56) References Cited

U.S. PATENT DOCUMENTS

| | | | |
|---|---|---|---|
| 5,334,987 A | 8/1994 | Teach | |
| 5,928,309 A | 7/1999 | Korver | |
| 5,987,383 A | 11/1999 | Keller | |
| 6,087,984 A | 7/2000 | Keller | |
| 6,104,339 A | 8/2000 | Nichols | |
| 6,198,992 B1 | 3/2001 | Winslow | |
| 6,314,348 B1 | 11/2001 | Winslow | |
| 6,353,409 B1 | 3/2002 | Keller | |
| 6,356,819 B1 | 3/2002 | Winslow | |
| 6,377,889 B1 | 4/2002 | Van Soest | |
| 6,424,295 B1 | 7/2002 | Lange | |
| 6,463,374 B1 | 10/2002 | Keller | |
| 6,501,422 B1 | 12/2002 | Nichols | |
| 6,549,849 B2 | 4/2003 | Lange | |
| 6,609,065 B1 | 8/2003 | Lange | |
| 6,686,878 B1 | 2/2004 | Lange | |
| 6,804,587 B1 | 10/2004 | Connor | |
| 7,054,731 B1 | 5/2006 | Lange | |
| 7,065,440 B2 | 6/2006 | Aral | |
| 7,156,328 B2 | 1/2007 | Samaha | |
| 7,188,015 B2 | 3/2007 | Lange | |
| 7,200,490 B2 | 4/2007 | Lange | |
| 7,363,132 B2 | 4/2008 | Lange | |
| 7,363,154 B2 | 4/2008 | Lindores | |
| 7,383,114 B1 | 6/2008 | Lange | |
| 7,715,979 B2 | 5/2010 | Dix | |
| 7,729,853 B2 | 6/2010 | Price | |
| 7,844,378 B2 | 11/2010 | Lange | |
| 7,860,628 B2 | 12/2010 | Lange | |
| 2003/0111546 A1* | 6/2003 | Schaffter et al. | 239/69 |
| 2008/0275602 A1 | 11/2008 | Peake | |
| 2009/0099737 A1* | 4/2009 | Wendte et al. | 701/50 |
| 2009/0118904 A1 | 5/2009 | Birnie | |

\* cited by examiner

*Primary Examiner* — Michael J Zanelli
(74) *Attorney, Agent, or Firm* — NUPAT, LLC; Morrison Ulman

(57) ABSTRACT

Predictive tractor path adjustments improve implement tracking performance by enabling agricultural autopilots to anticipate the effect of curves, slopes, changing soil conditions and other influences.

2 Claims, 10 Drawing Sheets

NO WIND

WIND

AGRICULTURAL AUTOPILOT PATH ADJUSTMENT

RELATED APPLICATIONS

This application is a division of U.S. Ser. No. 13/108,826 filed on May 16, 2011.

TECHNICAL FIELD

The disclosure is related to autopilots for agricultural equipment.

BACKGROUND

Farmers in the United States operate over two million farms covering roughly one billion acres of land and producing hundreds of billions of dollars of crops each year. The farmers spend tens of billions of dollars per year on seeds, fertilizer, chemicals and fuel. A modern farm is a complex operation where precision and efficiency can have a significant impact on the bottom line. According to the USDA, the most efficient 25% of US corn growers spend about $1 to grow a bushel of corn while growers in the least efficient 25% spend $3 to grow the same amount.

One way farmers improve efficiency is by avoiding unnecessary overlaps in tilling, spraying and harvesting operations. In other words, they avoid driving their tractors and equipment over the same area twice. Consider an 80-acre field and a 44-foot wide sprayer towed behind a tractor as an example. The sprayer is towed across the field in series of overlapping tracks. If the overlap between adjacent sprayer tracks is reduced from two feet to four inches, then four acres of spraying are eliminated. Such precision may be achieved by guiding tractors with global positioning system (GPS) based steering systems.

Precision control of towed farm implements such as plows, rippers, disks, planters, applicators, drills and other equipment has other benefits as well. It makes it easier to operate machinery in dark or dusty conditions. Operators can drive faster and reduce driving stress. The quantity of fuel and chemicals used can be decreased, thereby saving money and the environment. Soil compaction can be avoided by keeping heavy equipment on precise tracks.

Advances in GPS technology (and systems based on other global navigational satellite systems (GNSS) such as the Russian GLONASS and the European GALILEO) have made it possible to drive large farm tractors along predetermined paths very accurately. A tractor can return to a field a year after first working it and follow the same track within an inch. Control of towed implements is more difficult, however.

A towed implement is attached to a tractor by a hitch and the tractor pulls the implement across the ground. The implement may wander off its intended path for any number of reasons including asymmetrical loading (e.g. tougher ground to plow on one side than the other) or drag due to operating on a slope. Skilled tractor operators can compensate for a wandering implement by deliberately steering the tractor away from a desired path so that the implement stays on the path even though the tractor does not. However, despite the best efforts of operators, this manual method is imprecise, takes a long time and travel distance, and causes operator fatigue.

"Automatic Control of Passive, Towed Implements" (U.S. patent application Ser. No. 12/244,198, filed on Oct. 2, 2008) describes systems and methods that guide towed implements along a desired path by directing an autopilot-controlled tractor optimally off the path. These and other feedback methods for controlling towed implements provide optimal reactions to disturbances. They decrease the response time required for an implement to execute a step offset from a predetermined path.

Despite the success of feedback control systems for towed implements, further improvements are possible. In particular, feedback control systems have not eliminated implement tracking errors that can occur on curved paths or changing slopes. What is needed are new systems and methods to ensure that towed implements follow their intended paths as accurately as possible even when those paths include curves, changing slopes or other known influences.

DETAILED DESCRIPTION

Tractors pull implements. But implements do not follow tractors' paths exactly. To make an implement follow a desired path, a tractor often has to take a different path.

Conventional feedback control systems for towed implements react to disturbances. As soon as an implement starts to drift away from its path, the control system guides a tractor to pull the implement back on track. The systems and methods described below improve implement control performance by anticipating the effects of influences such as curves, slopes, soil changes and wind.

Advance knowledge of influences may be obtained from maps of desired implement paths, topography, soil conditions, wind and other factors. Maps and other data may come from external sources or may be measured for later use.

Given a desired implement path and anticipated influences, an optimal tractor path may be predicted. In the absence of disturbances, a tractor travelling along its optimal path tows an implement along its desired path and the effect of anticipated influences is eliminated. For example, the anticipated effect of a known slope (implement slips downhill) is taken care of in advance by a tractor path that lies uphill from the desired implement path. Feedback control is still useful to correct for disturbances, such as bumps and unanticipated influences (e.g. an unmapped hill), for these can never be completely eliminated.

Figure 1:
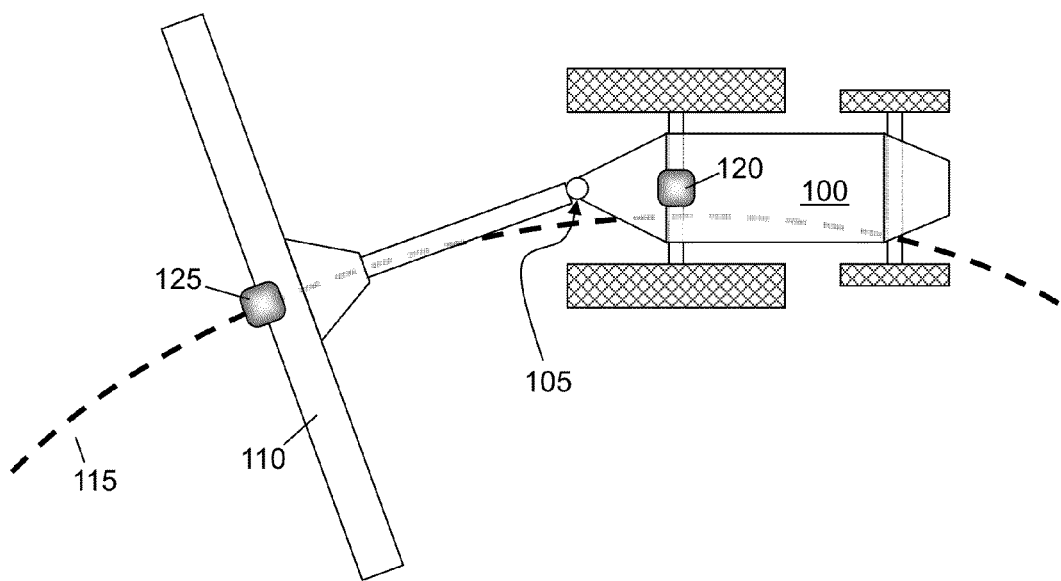
FIG. 1 illustrates a tractor towing an implement along a desired path.

FIG. 1 illustrates a tractor towing an implement along a desired path. Tractor 100 pulls implement 110 via hitch 105. Dashed line 115 indicates a desired path along which the implement is to move. Note that although the implement is on desired path 115, the tractor is not. The position of tractor 100, as represented by a reference point at the midpoint of the tractor's rear axle, is measured by a GNSS receiver connected to antenna 120. Similarly, the position of implement 110 is measured by a GNSS receiver connected to antenna 125 located at a reference point on the implement. In practice, antennas 120, 125 are usually mounted above their respective reference points. When the tractor and implement pitch and roll away from level, the antennas are no longer are no longer at the same horizontal position as the reference points. Inertial measurement units (IMU) may be used to measure pitch and roll of the tractor and/or implement and the pitch and roll angles may then be used to correct for antenna lever arm errors. When IMU is used with GNSS, the combination is referred to as INS, for "inertial navigation system".

(The GNSS receivers used to measure the position of the tractor and the implement may take advantage of corrections such as those provided by satellite or ground based augmentation systems (SBAS or GBAS). Examples of SBAS include the Federal Aviation Administration's Wide Area Augmentation System (FAA WAAS), the European Geostationary Navigation Overlay Service (EGNOS) operated by the European Space Agency, the Multi-functional Satellite Augmentation System (MSAS) operated by Japan's Ministry of Land, Infrastructure and Transport, and various proprietary systems operated by commercial enterprises. Examples of GBAS include the United States' Local Area Augmentation System (LAAS) and various European differential GPS networks. Even greater accuracy can be achieved by measuring GNSS carrier phase using so-called real time kinematic (RTK) techniques involving a nearby base station located at a surveyed position. RTK allows centimeter-level positioning, for example.)

Figure 2:
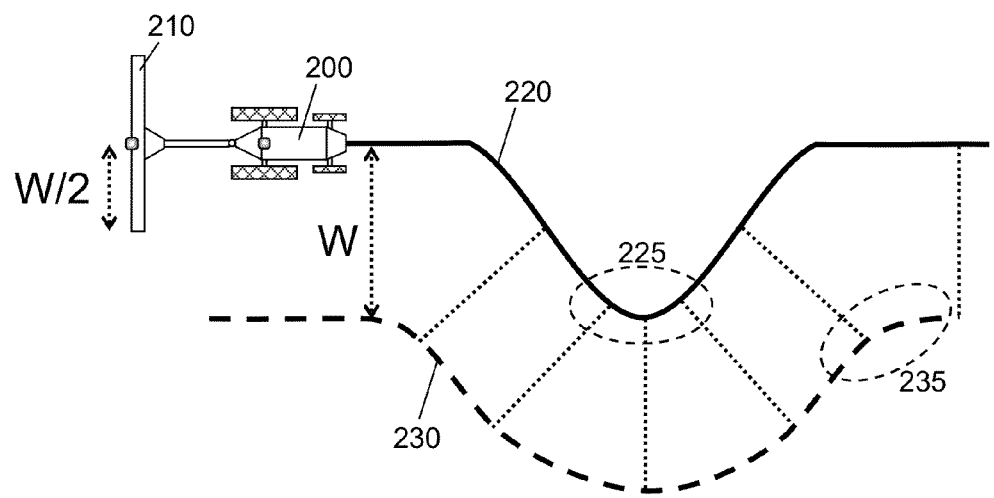
FIG. 2 illustrates equidistant swath layout.

Tractor and implement paths may coincide from time to time, but in general they are different. Curved paths offer a common scenario which illustrates relationships between implement and tractor paths. A farmer typically begins a field operation by towing an implement along an edge of the field. This first pass is done under manual control, but an autopilot records the implement path. In FIG. 2, for example, tractor 200 pulls implement 210 along path 220. The implement path has curves because the edge of the field may be curved or the farmer may have had to maneuver to avoid obstacles such as trees or rocks. After the first pass, the autopilot calculates a set of implement paths that will complete the job of covering the field with minimum overlap.

Equidistant swath layout, illustrated in FIG. 2, is one way to accomplish this goal. Given an implement width, W, and a first path 220, the autopilot calculates a second path 230 that is W away from the first path. Equidistant swaths account for the implement width being perpendicular to the direction of travel. In equidistant swath layout, convex curves such as 225 have increasing radii of curvature in subsequent swaths while concave curves such as 235 have decreasing radii of curvature. To keep all parts of an implement moving forward, an equidistant swath layout method should enforce a minimum radius of curvature greater than or equal to W/2.

Anyone who has watched an eighteen wheeler make a turn at an intersection knows that the truck driver drives his cab out into the middle of the intersection before making a wide turn. The rear wheels of the trailer take a much different path, hugging the inside of the turn and sometimes cutting the corner too much and jumping up onto the curb. If it were allowed to drive a truck, a conventional farm tractor autopilot would make the opposite mistake, rear wheels too far away from the corner, because the conventional autopilot does not anticipate turns. It only reacts to deviations of the implement (i.e. the trailer) from the implement's desired path and so it would not start making corrections until the rear wheels started to miss the turn. Back on the farm, an autopilot that has laid out a set of equidistant swaths to work a field has in its memory knowledge of all the turns that an implement will have to make. Autopilot path adjustment systems and methods described herein use knowledge of future implement turns to calculate an adjusted path for a tractor to follow so that the implement follows its desired path as closely as possible. The advanced autopilot is like a very good truck driver that sees a turn coming and drives his cab beyond a turning lane so that the rear wheels of the truck follow the lane perfectly.

Figure 3:
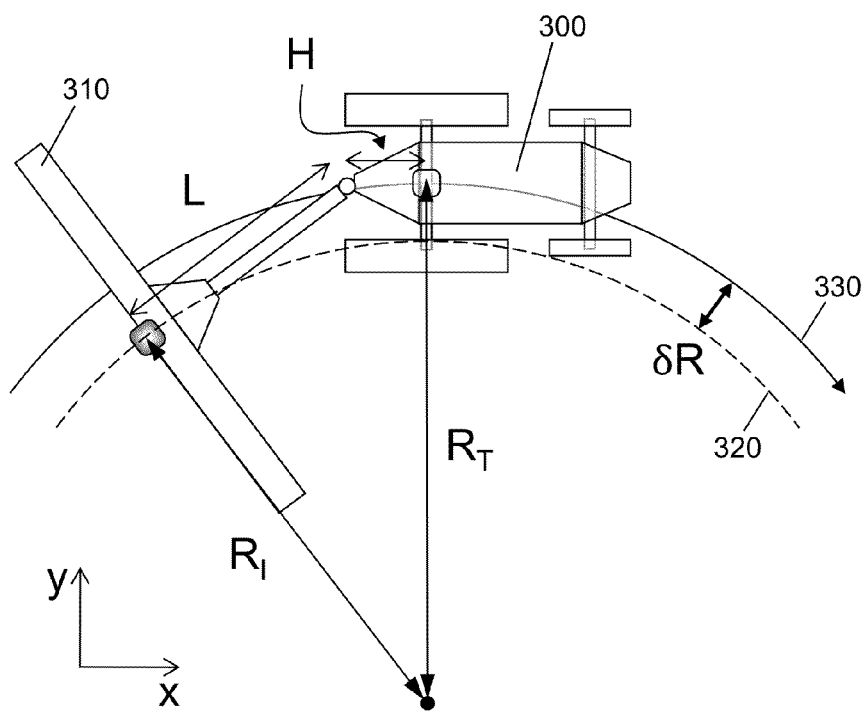
FIG. 3 illustrates a basic curved-path adjustment.

FIGS. 3 and 4 illustrate basic and advanced curved-path adjustments, respectively. In FIG. 3, tractor 300 pulls implement 310 along desired implement path 320. The distance from the tractor reference point at the middle of its rear axle to the hitch is H. The distance from the hitch to the implement reference point is L. When H is less than L (as it practically always is) the implement tends to drift toward the inside of turns. For the short segment shown in the figure, desired implement path 320 may be approximated as an arc of a circle having radius $R_I$. The tractor follows an arc 330 having a greater radius of curvature, $R_T = \sqrt{R_I^2 - H^2 + L^2}$ to keep the implement on its desired path.

A basic method of predictive path adjustment, therefore, is to examine curves in a desired implement path and at each curve add an offset $\delta R = R_T - R_I$ (toward the outside of the curve) to a feedback autopilot cross-track error set-point. This is what is done in some conventional systems. This method is better than doing nothing, but it has some deficiencies: it does not take direction of travel into account; it adjusts cross-track error, but not tractor heading; and, it leads to sharp corrections at the beginning and end of turns.

Figure 4A:
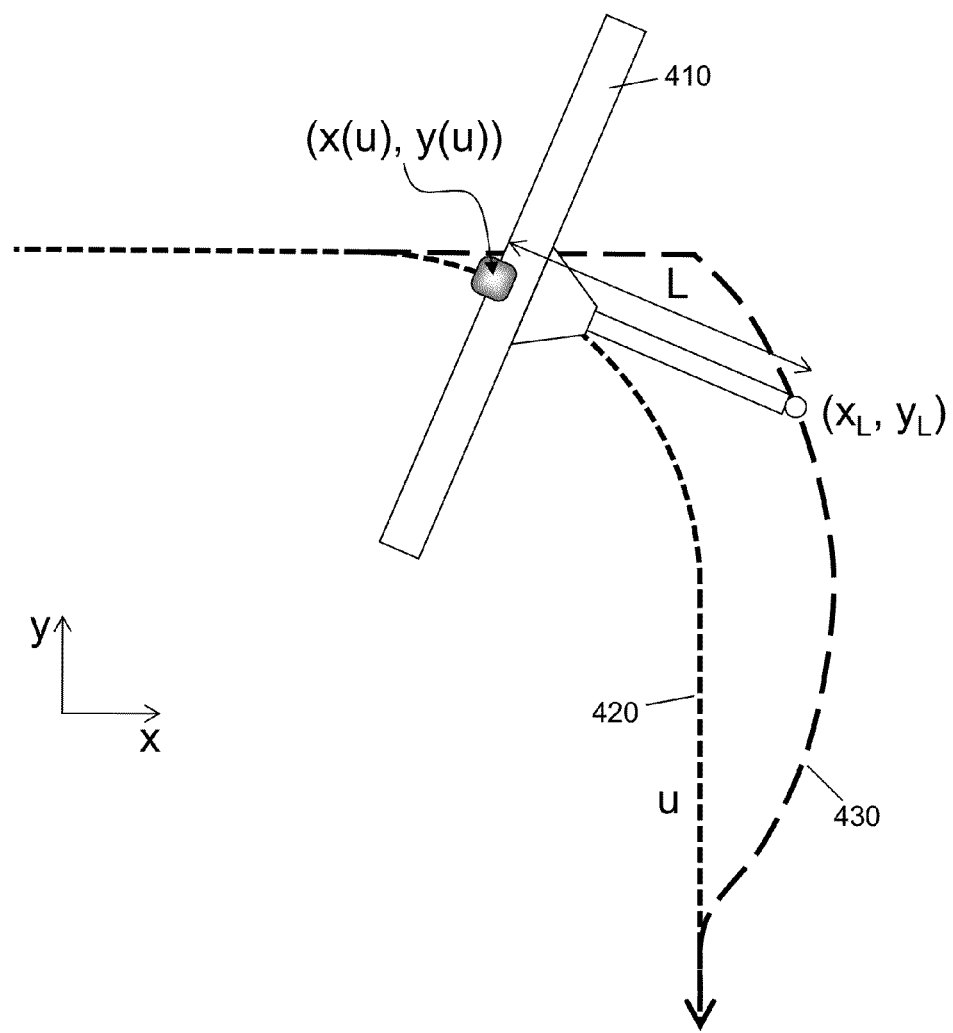
FIGS. 4A and 4B illustrate an advanced curved-path adjustment.
Figure 4B:
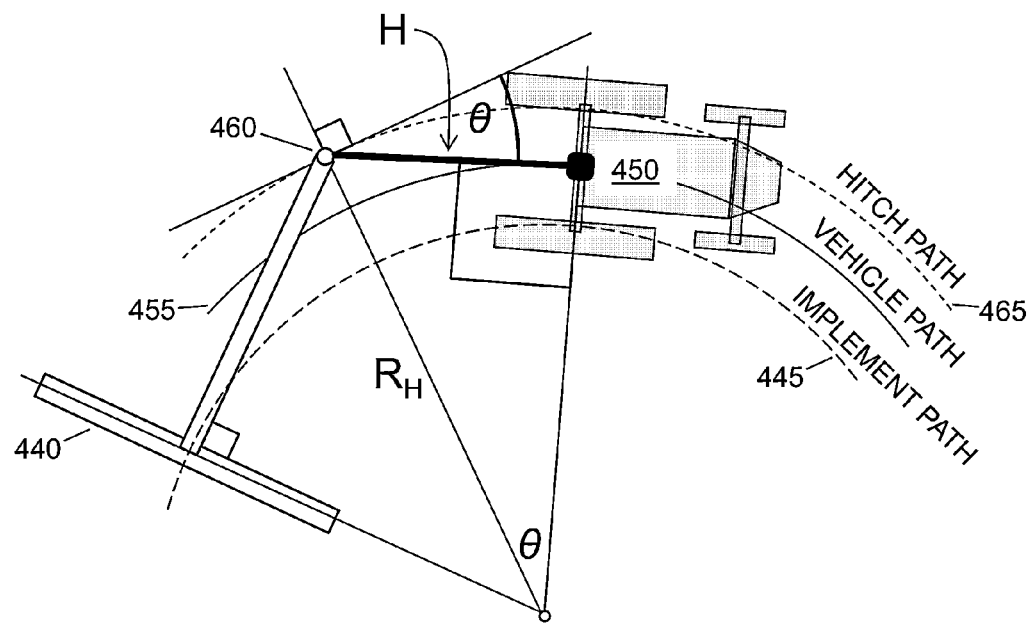

FIGS. 4A and 4B illustrate an advanced curved-path adjustment. In FIG. 4A, implement 410 is pulled along desired implement path 420. The distance from the implement reference point (x(u), y(u)) to its hitch point $(x_L, y_L)$ is L. A tractor, attached to the implement via a hitch, is omitted from FIG. 4A for clarity. An advanced method of predictive path adjustment first finds the path that the hitch must travel to keep the implement on its desired path. For every point (x(u), y(u)) on the implement desired path, the corresponding point on the hitch path is given by: $(x_L, y_L) = (x(u) + \Delta x, y(u) + \Delta y)$ where $$\Delta x = \frac{L}{\sqrt{1+m}},$$

$$\Delta y = \frac{mL}{\sqrt{1+m}}$$

and $$m = \frac{dy}{du} \bigg/ \frac{dx}{du}$$

is the Cartesian slope of the desired implement path at (x(u), y(u)). (We use the phrase "Cartesian slope" to mean the derivative of a function, e.g.

$$\frac{dy}{dx},$$

in a plane. "Cartesian slope" distinguishes this concept from hill "slope" which is terrain angled with respect to horizontal.)

In some cases, H<<L, and the hitch path is a close approximation to the tractor path. In general, however, a separate tractor path is calculated starting from the hitch path. The "tractor path" refers to the path taken by the control point of the towing vehicle. For a conventional tractor the control point may be the midpoint of the rear axle, for example. It may be the midpoint of the fixed axle in other wheeled vehicles, the center of vehicle rotation and/or the midpoint of a tracked vehicle's track footprint.

FIG. 4B illustrates one technique for finding a tractor path from a hitch path. This technique relies on the assumption that the hitch path can be adequately approximated as circular for an along-track length equal to (or greater than) the hitch length. In FIG. 4B implement 440 is pulled along implement path 445 by hitch 460 that travels along hitch path 465. The hitch is fixed to tractor 450 which travels along tractor path 455. In FIG. 4B, hitch path 465 is circular for at least the length H that separates hitch point 460 from the control point of tractor 450. The radius of curvature of the hitch path is $R_H$ as indicated in the figure. The hitch extends from the rear of the tractor at right angles to the tractor's rear axle and the tractor's heading is tangent to the tractor path. Given these constraints, a point on the tractor path may be found from a corresponding point on the hitch path. As shown in the figure, a tractor path point is located a distance H away from the corresponding hitch path point at an angle $$\theta = \sin^{-1}\left(\frac{H}{R_H}\right)$$

away from the tangent to the hitch path.

$R_H$ may change from point to point along the hitch path. If $R_H$ changes quickly, so that the hitch path is not circular over the hitch length, then the tractor path may be found by iterative solution over segments shorter than H. Numerical techniques may be used calculate iterative solutions for the tractor path or even for an arbitrary chain of towed vehicles.

Returning for a moment to the tractor-trailer truck example, tractor path 455 (or hitch path 430 in cases where H<<L) corresponds to the path that the cab of a large truck takes around a corner, while implement path 445 (or 420) corresponds to the path taken by the rear wheels of the trailer. In contrast to the basic method described in connection with FIG. 3, the advanced method does account for direction of travel; it produces a tractor path from which tractor desired heading may be derived; and, it leads to smooth implement transitions at the beginning and end of turns.

Given a desired implement path (from an equidistant swath layout, for example), the advanced method described above leads to a desired tractor path. The autopilot controlling the tractor therefore keeps track of two paths: the desired implement path and the corresponding calculated tractor path. In the context of this disclosure, the tractor path is said to be "adjusted from the desired implement path." The adjustment is predictive in that it is performed before the tractor and implement actually travel on their respective paths.

If the tractor follows the calculated tractor path, then the implement will follow the desired implement path; however, disturbances such as bumpy ground, steering errors, model errors and random effects inevitably lead the implement astray. Therefore a feedback system, such as that described in "Automatic Control of Passive, Towed Implements" (U.S. patent application Ser. No. 12/244,198, filed on Oct. 2, 2008), may be used to make the implement follow its path precisely. Predictive adjustment of the tractor path makes the feedback controller's job easier: the effects of known influences (curves) are anticipated so the controller need only react to unpredictable, but small, disturbances.

An autopilot can make predictive adjustments to a tractor's path whenever the implement's desired path is known in advance. Given a series of implement swaths covering a field, the autopilot may calculate a corresponding tractor path for the whole field quickly. However, because the calculation is such a simple exercise for a modern microprocessor it is not necessary to work very far ahead. As discussed above, a hitch path point may be calculated from an implement path point given the Cartesian slope of the implement path at that point and the implement length, L. If the implement path is represented by a series of discrete points fit by, e.g. a cubic spline, then the Cartesian slope at each point depends only on the position of the point itself and the positions of the nearest points ahead and behind on the path. Similarly, a tractor path can be calculated point by point from the hitch path given the Cartesian slope at the corresponding hitch path point and the hitch length H. Thus a tractor path can be calculated point by point as needed. On the other hand, one reason to calculate a complete tractor path is to check for conflicts. A tractor may not be able to pull an implement right to the edge of a field if doing so would require the tractor go outside the field, through a fence, into a ditch, etc.

As briefly mentioned above, H<<L in some cases. It is even possible for H=0; i.e. the implement is connected to the tractor at the tractor's control point. Another scenario, that applies, for example, to self-propelled sprayers, is L=0. When L=0, the implement is a fixed extension of the tractor. (Fixed extensions include implements rigidly attached by three-point connections.) On a self-propelled sprayer, spray booms extend out from the spray truck, but their spatial orientation is fixed with respect to the truck. In contrast, farm implements towed from a hitch (L≠0) pivot from the hitch point. Thus, for purposes of this disclosure, a "hitch" is a fixed extension from a vehicle. H is the distance from the vehicle control point to: (1) a hitch point that pulls an implement (L≠0); or, (2) a fixed extension from the vehicle (L=0), e.g. a spray nozzle on a fixed spray boom.

As we have seen, a curve is an example of a predictable influence whose effect can be anticipated. Another example is a slope. When a tractor guided by a feedback autopilot pulls an implement across a hill, the implement drifts downhill. Sensing the positioning error (implement downhill from desired path), a feedback autopilot guides the tractor uphill to compensate. On a straight path on a constant slope, the tractor and implement reach a steady state with the tractor path uphill and parallel to the implement path, the tractor path being offset from the desired implement path just enough that the implement stays on track. A feedback autopilot can only react to implement path errors, however. There is inevitably some time during which the implement drifts downhill while waiting for the autopilot-controlled tractor to make sufficient corrections. The sloped-path adjustment of FIG. 5 eliminates the wait by anticipating the effect of slopes and compensating accordingly.

Figure 5A:
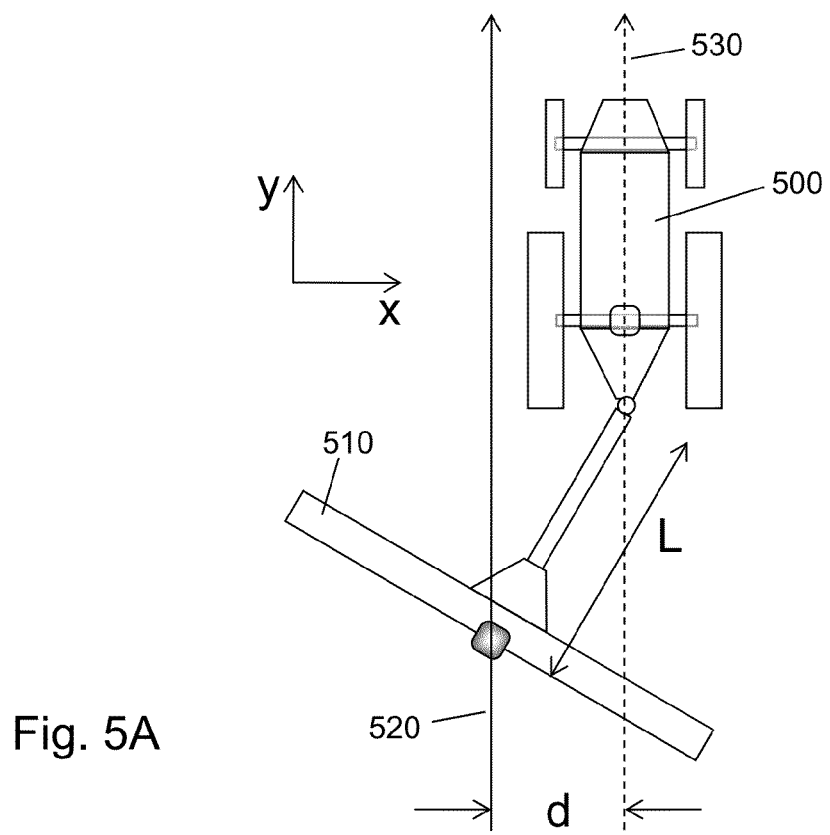
FIGS. 5A and 5B illustrate a sloped-path adjustment.
Figure 5B:
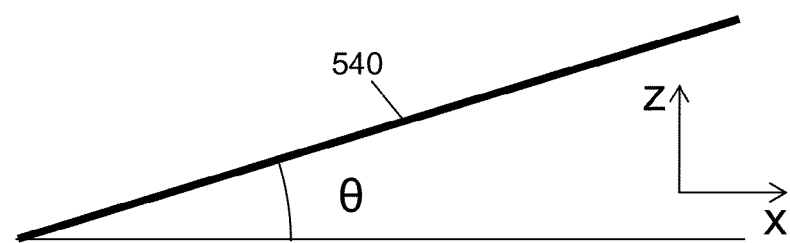

FIGS. 5A and 5B illustrate a sloped-path adjustment. In FIG. 5 tractor 500 pulls implement 510 along desired implement path 520. The tractor accomplishes this task by driving on tractor path 530 uphill from the implement path by an amount "d". The distance between the implement reference point and its hitch is "L" as shown in FIG. 5A. FIG. 5B shows the sloped ground 540 upon which the tractor and implement travel. The angle of the slope with respect to horizontal is θ.

A simplified, but illustrative, model of an implement is a block that is dragged behind a tractor. The force required to move it is a fraction, μ, of its weight. μ may be thought of as a coefficient of friction; it is zero if the block is resting on a frictionless surface but it may be greater than one if the block has a good grip on the surface below it. The amount, d, that an implement sags downhill, or equivalently the amount by which a tractor must offset its path uphill to keep the implement on track is given by:

$$\frac{d}{L} = \frac{\frac{1}{\mu}\tan\theta}{\sqrt{1 + \left(\frac{1}{\mu}\tan\theta\right)^2}}.$$

Figure 6A:
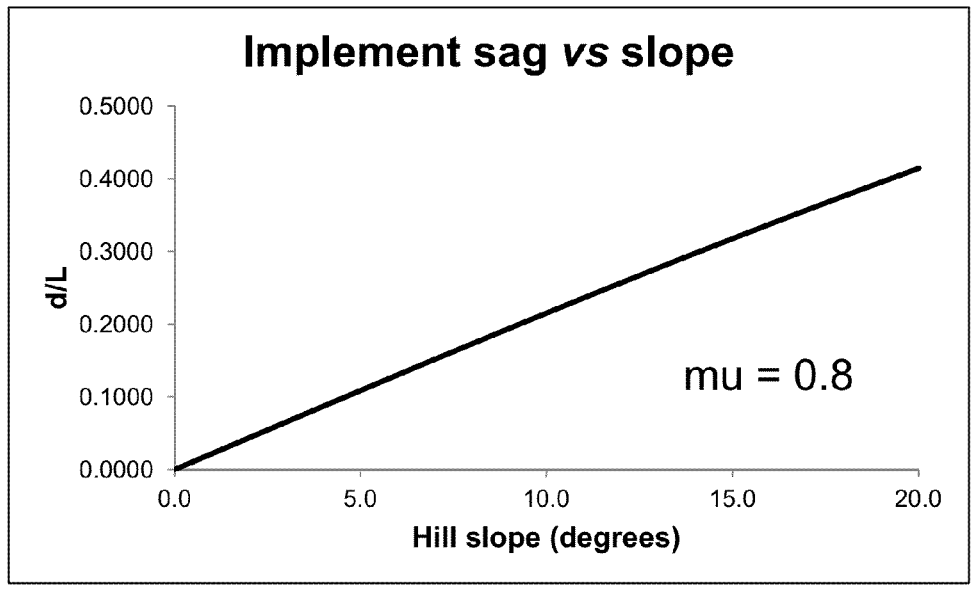
FIGS. 6A and 6B are graphs of implement sag versus slope and coefficient of friction, respectively.
Figure 6B:
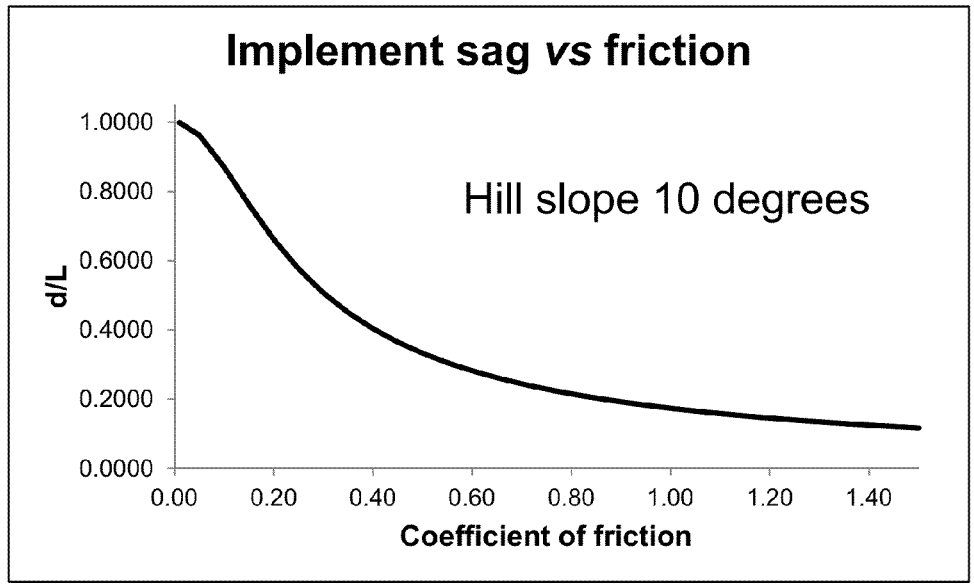

This relationship is illustrated in FIGS. 6A and 6B which are graphs of implement sag (d/L) versus slope and sag versus coefficient of friction, respectively. As an example, FIG. 6A shows that when $\mu=0.8$, a ten degree slope will cause an implement (modeled as a block) to sag downhill by about 20% of L. FIG. 6B shows that the sag on a ten degree hill can be reduced to about 10% of L if $\mu$ can be increased to around 1.5 or more. d/L is an approximately linear function of $\mu$ or $\theta$ for typical values of those variables. When friction is very small, implement sag approaches implement length.

In practice $\mu$ may be a complicated, nonlinear function of soil conditions, implement details and hill slope, $\theta$. Further, $\mu$ for typical farm implements is strongly dependent on direction; it is a lot easier to pull a drawn chisel plow forward than sideways, for example.

Estimating $\mu$ from first principles is most likely futile, but linear or higher order models for implement sag as a function of hill slope can be determined by least-squares approximation of recorded sag vs. slope data. The observed sag of an implement in known soil conditions on a known slope can be used to create such an empirical model. The model may then be used to predict downhill sag of the same implement in the same soil conditions on a different slope.

An autopilot has advance knowledge of the desired path of an implement as discussed above in connection with path adjustments to anticipate the effect of curves. The autopilot may also have knowledge of the terrain over which a path runs. This knowledge may take the form of digital topographic and/or soil condition maps, for example. Topographic and/or soil condition data may be stored in memory in an autopilot (e.g. microprocessor RAM, flash drive, etc.) or it may be supplied as needed by wireless link (e.g. WiFi, other radio services, etc.). Furthermore, an autopilot's roll sensor may be used to measure terrain slope and, since the tractor is ahead of the implement by distance L, provide advance warning of slope changes.

Terrain and/or soil condition data allow an autopilot to make predictive tractor path adjustments on slopes. A tractor path may be calculated as an uphill offset from an implement path where the amount of offset depends on terrain slope, soil condition and implement type. An autopilot may also record the amount of downhill sag for a specific implement, slope and soil condition, and use least-squares estimation to model the relationship between sag and slope. Uphill tractor offset may then be calculated based on the recent history of offsets needed to compensate for various slopes. The autopilot may continuously update its model as field conditions change. Accumulated data leads to improved predictions for the same implement on different slopes and/or different soil conditions. Soil condition maps may be generated from implement sag data when terrain slope is known.

An autopilot can anticipate hills from map data, roll data recorded from previous trips over the same ground or roll sensor input. If the tractor follows the predicted uphill path, then the implement will follow its intended path in the absence of disturbances. Since disturbances can never be eliminated, a feedback system, such as that described in "Automatic Control of Passive, Towed Implements" (U.S. patent application Ser. No. 12/244,198, filed on Oct. 2, 2008), may be used to make the implement follow its path precisely. Predictive adjustment of the tractor path makes the feedback controller's job easier: the effects of known influences (slopes) are anticipated so the controller need only react to unpredictable, but small, disturbances. In addition to bumps and other noise, disturbances include deviations of actual terrain slope from its expected value.

Wind is a third example of an influence whose effect may be predicted. When a tractor or spray truck sprays chemicals on a field on a windy day, the spray tends to drift downwind before landing on crops or ground as intended. This effect can be compensated for by adjusting the tractor or spray truck's path upwind.

Figure 7A:
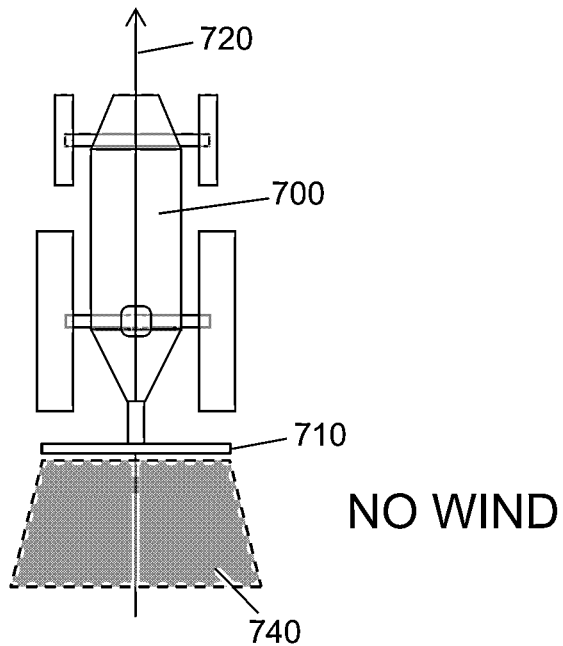
FIGS. 7A and 7B illustrate a crosswind-path adjustment.
Figure 7B:
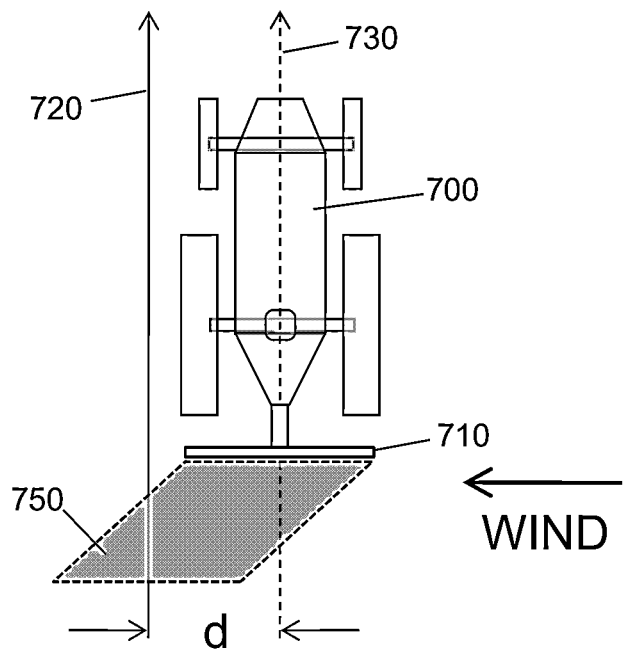

FIGS. 7A and 7B illustrate a crosswind-path adjustment. In FIG. 7A tractor or spray truck 700 sprays chemicals from spray boom 710 in no-wind conditions. Spray 740 is evenly distributed on either side of intended spray path 720. In FIG. 7B the tractor or spray truck sprays chemicals in crosswind conditions. Because of the wind, the tractor follows path 730, upwind of intended spray path 720, so that spray 750 lands evenly distributed on either side of the intended spray path. Of course, not all winds are direct crosswinds. A convenient simplification, therefore, is to consider only the crosswind component of a quartering wind. In general, however, the effect of wind in any direction may be taken into account.

A tractor or spray truck may detect apparent wind speed and direction with an onboard anemometer and wind vane. This information may be combined with an autopilot's knowledge of tractor speed and direction to compute the true wind speed and direction. Alternatively, wind direction and speed may be measured remotely, at the edge of a field or at a nearby crop duster strip, for example, and the data may be sent to the tractor via radio.

Onboard and remote wind sensing may be combined. Suppose, for example, that the local weather forecast calls for wind from the east at 20 knots. An autopilot may use that information to lay out a series of swaths to spray a field. The tractor path is upwind (east) of where it would be in zero wind. If an onboard anemometer measures the actual wind to be from the east at 23 knots, then the autopilot may make an adjustment to take into account the additional, unpredicted wind.

The amount of offset ("d" in FIG. 7B) required for a particular spray apparatus versus wind speed may be determined empirically and the results stored in memory. Spray droplet size may have a profound effect on drift distance. Unlike the influences of curves and hills discussed above, the effect of wind on spraying operations isn't usually monitored automatically. The tractor or spray truck's path is not under feedback control with respect to actual spray results. The benefit of upwind path adjustment depends on the accuracy of empirical calibration data. Nonetheless the capability of adjusting upwind offset automatically as wind speed changes makes crosswind spray operations easier for spray operators as such changes are not necessarily readily apparent in a truck or tractor cab.

Figure 8:
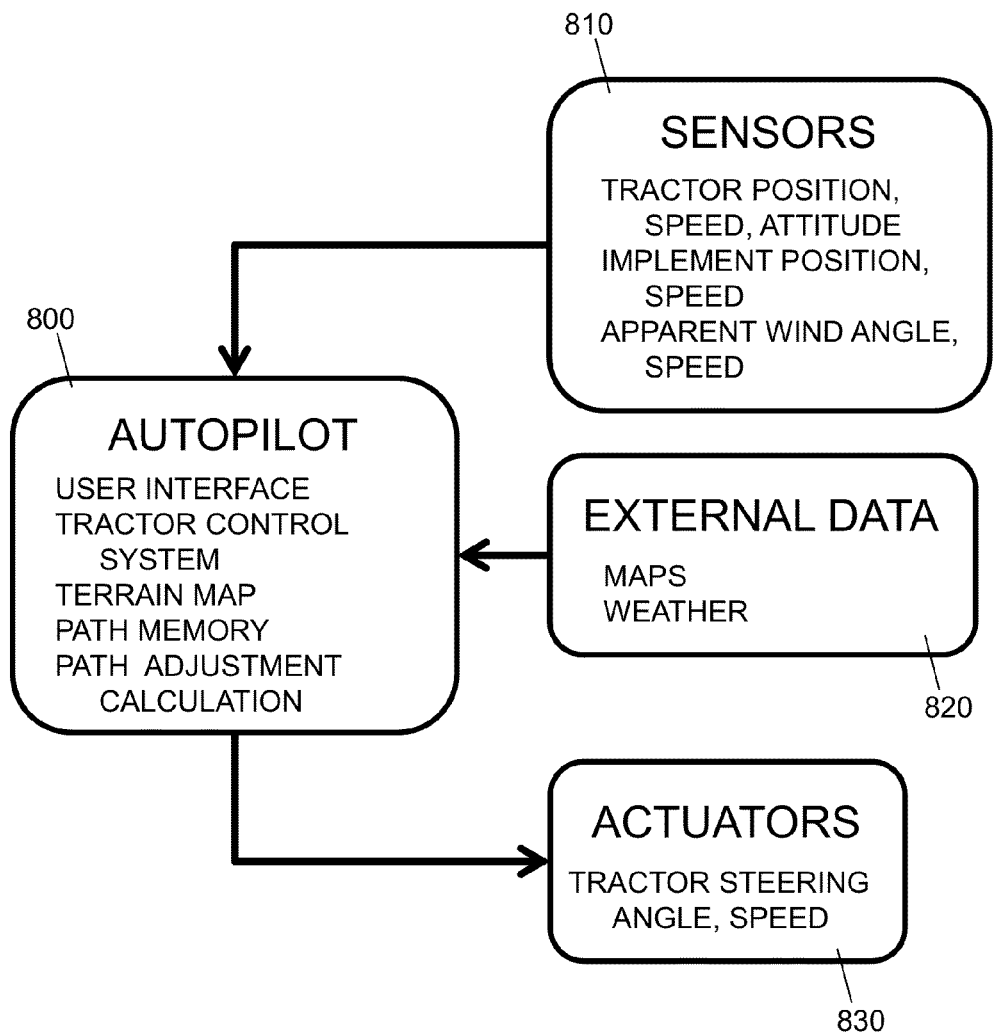
FIG. 8 provides an overview of an agricultural autopilot that makes predictive path adjustments.

FIG. 8 provides an overview of an agricultural autopilot that makes predictive path adjustments for curves, hills, wind or other known influences. In FIG. 8, autopilot 800 receives input from sensors 810 and external data 820; the autopilot sends output to actuators 830. Autopilot 800 may include a microprocessor, user interface, tractor control system, terrain map, path memory and path adjustment capability as well as other components. Sensors 810 may include tractor position, speed, acceleration and attitude sensors, implement position, speed, acceleration and attitude sensors, apparent wind angle and speed sensors as well as other components. External data 820 may include maps of terrain, soil condition, or other variables, weather data, and other data. Actuators 830 may include tractor steering angle and speed actuator, and other actuators.

In autopilot 800 a user interface may include a display screen and real or virtual buttons for user input. An example of a tractor control system that may be included in the autopilot is a control system such as that described in "Automatic Control of Passive, Towed Implements" (U.S. patent application Ser. No. 12/244,198, filed on Oct. 2, 2008). Path adjustment calculations are performed within the autopilot by a microprocessor according to the methods described above; path memory stores calculated path data.

Sensors 810 include GNSS receivers, accelerometers, gyroscopes and other sensors, many of which are parts of conventional autopilot and implement tracking systems. Apparent wind angle and speed may be measured by a wind vane and anemometer. True wind angle and speed, as measured by external instruments may be part of external data 820.

Figure 9:
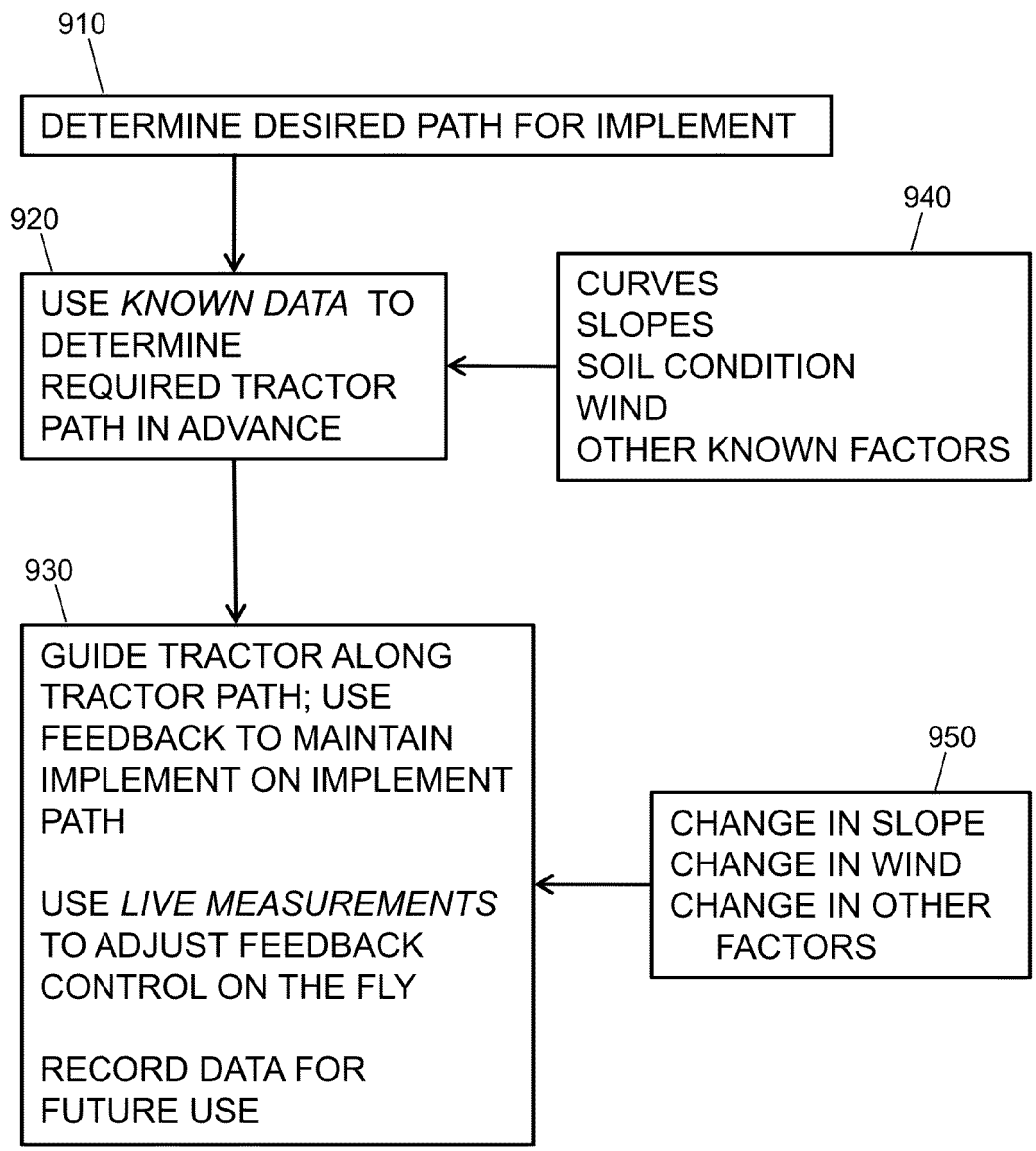
FIG. 9 is a flow chart for a predictive path adjustment method.

FIG. 9 is a flow chart for a predictive path adjustment method. Steps in the flow chart of FIG. 9 are optional unless otherwise stated. The starting point for the method in FIG. 9 is step 910, determine (or provide) a desired path for implement. The desired implement path may be the result of an equidistant swath layout calculated by an autopilot; it may be a layout designed externally (e.g. in a computer aided farming software suite) and loaded into an autopilot as a series of path points; or it may be determined by another method.

Step 920 is using known data to determine required tractor path in advance. Known data 940 pertains to predictable influences such as implement path curves, slopes, soil conditions, wind and other known factors. The required tractor path is the path that, in the absence of disturbances, compensates for the effects of known influences such that the implement follows its desired path.

Because disturbances can never be eliminated, step 930 is guiding the tractor along the tractor path optionally using feedback to maintain the implement on the implement path. Although feedback is desirable for implement control, it is not required and in some cases it is not easy to implement. For example, it is not easy to continuously monitor the effect of wind on a spray pattern.

Step 930 further includes using live measurements 950 to adjust a feedback control system on the fly. These live measurements help reduce the effects of unanticipated changes in known influences 940. Consider for example a path that traverses a slope. An autopilot calculates a tractor path that will compensate for the effect of the expected slope. When the tractor arrives at the slope, it may turn out that the actual slope is different from expected. A control system will eventually compensate for this difference using feedback from the reported implement position just as it would without advance slope information. Better performance is obtained, however, if the difference between expected and actual conditions is used to adjust a feedback control system, e.g. by changing a cross-track error set point, on the fly.

Finally data, such as actual tractor and implement paths, may be recorded for future use. Recorded data is often the most accurate and precise source of terrain information.

The systems and methods described above improve implement (and spray) control performance by anticipating the effects of influences such as curves, slopes, soil changes, wind, etc. This improved control contributes to more precise and efficient farming.

The above description of the disclosed embodiments is provided to enable any person skilled in the art to make or use the disclosure. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for improving agricultural spray accuracy in crosswinds comprising:
   providing a desired spray path for a spray apparatus;
   estimating a tractor path by adjusting the spray path upwind by an offset that is a function of: predicted wind speed and direction according to a local weather forecast, and empirical wind offset data pertaining to the spray apparatus;
   estimating true wind speed and direction on the tractor path from: apparent wind speed and direction measurements obtained onboard a tractor, and tractor speed and direction; and,
   guiding the tractor along the tractor path with an autopilot such that the spray apparatus sprays an agricultural chemical along the desired spray path, the autopilot compensating for differences between: the true wind speed and direction, and the predicted wind speed and direction.

2. A system for guiding an agricultural spray vehicle comprising:
   a GNSS receiver;
   wind angle and speed sensors;
   actuators for adjusting vehicle steering angle in response to autopilot commands; and,
   an autopilot that:
      a) comprises a memory that stores a desired spray path and empirical wind offset data pertaining to a spray apparatus;
      b) estimates a vehicle path based on: a desired spray path, predicted wind speed and direction according to a local weather forecast, and the empirical wind offset data;
      c) estimates true wind speed and true wind direction based on apparent wind speed and apparent wind direction measured by the wind angle and speed sensors, and vehicle speed and direction measured by the GNSS receiver;
      d) guides the vehicle along the vehicle path using the actuators; and,
      d) compensates for differences between the true wind speed and direction, and the predicted wind speed and direction, such that the spray apparatus sprays an agricultural chemical along the desired spray path.

* * * * *